United States Patent [19]

Koide

[11] 4,391,506

[45] Jul. 5, 1983

[54] DRIVING METHOD AND APPARATUS FOR ILLUMINATION TYPE IMAGING SYSTEM

[75] Inventor: Hiroshi Koide, Tokyo, Japan

[73] Assignee: Ricoh Company, Ltd., Tokyo, Japan

[21] Appl. No.: 324,309

[22] Filed: Nov. 23, 1981

[30] Foreign Application Priority Data

Nov. 26, 1980 [JP] Japan .................................. 55-166341

[51] Int. Cl.³ ............................................. G03G 15/00
[52] U.S. Cl. ..................................... 355/8; 355/14 R;
355/14 E; 355/55
[58] Field of Search ...................... 355/8, 49, 14 R, 55,
355/56, 14 E

[56] References Cited

U.S. PATENT DOCUMENTS

| 3,829,209 | 8/1974 | Buddendeck et al. | 355/14 R |
| 4,080,062 | 3/1978 | Torigai et al. | 355/8 X |
| 4,095,880 | 6/1978 | Shogren et al. | 355/8 |
| 4,124,289 | 11/1978 | Miyata et al. | 355/8 X |

Primary Examiner—A. C. Prescott
Attorney, Agent, or Firm—David G. Alexander

[57] ABSTRACT

A reciprocating illumination type imaging system is driven by a first drive source and a rotatable photoconductive drum is driven by a second drive source. A time period necessary for the drum to rotate a given angle is measured. The measured time period is compared with a predetermined reference time period to thereby estimate a fluctuation component in the time period of rotation of the drum in accordance with a result of the comparison. A start or buildup target speed during a buildup scanning speed motion of the imaging system and a constant target speed during a constant scanning speed motion are individually preset or determined in accordance with the estimated fluctuation component.

The imaging system comprises an optical lens having a given focal length. The first and second drive sources constitute a drive mechanism. The preset buildup target speed and/or the preset constant target speed is compensated in conformity with a deviation of the focal length of the lens from a nominal focal length and a deviation of a mechanical precision of the drive mechanism from a nominal mechanical precision. Further, the speed of the imaging system during a constant scanning speed motion is detected. The preset constant target speed is compensated in accordance with the detected speed of the imaging system.

9 Claims, 13 Drawing Figures

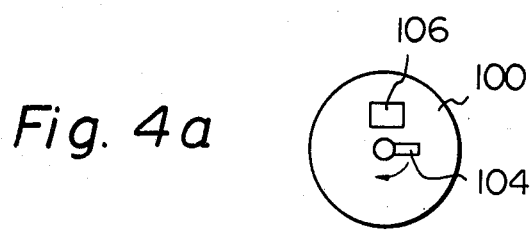
Fig. 4a
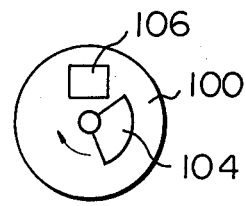
Fig. 4b
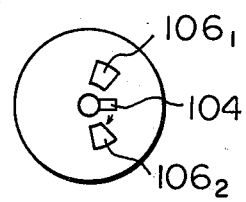
Fig. 4c
Fig. 5
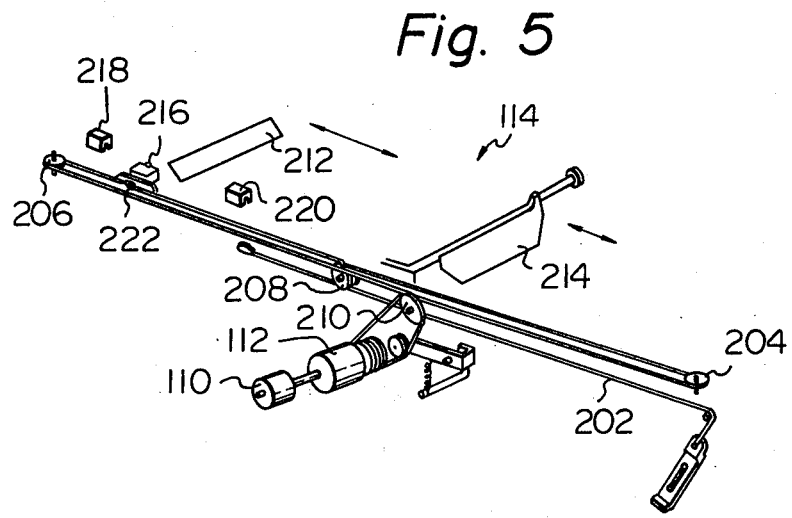

DRIVING METHOD AND APPARATUS FOR ILLUMINATION TYPE IMAGING SYSTEM

BACKGROUND OF THE INVENTION

The present invention generally relates to a driving method and apparatus for driving a reciprocating illumination type imaging system in synchronism with a moving photoconductive member in electrostatic photography.

A variety of instruments are known in which an illumination type imaging system moves along a predetermined path while a member to be imaged by the imaging system moves along a path which is different from the path of movement of the imaging system. In such a type of instrument, it is a prerequisite that the movement of the imaging system and that of the member to be imaged by synchronized or timed accurately to each other. Taking an electrostatic copying machine, for example, problems heretofore pointed out in connection with instruments of the type described will be discussed.

In an electrostatic copying machine, the member to be imaged by the imaging system may comprise a rotatable photoconductive drum as well known in the art. For timed movements of the imaging system and drum, it has been most customary to employ a design wherein power is supplied from a single drive source to both the imaging system and the drum via chains or wires and the imaging system is driven for reciprocation through a reversible clutch positioned in a power transmission line to the imaging system. A problem inherent in this design originates from the use of a single motor as the drive source and chains or like members as the gearing. When the operation speed of the motor is varied significantly or the chain vibrated as a result of a fluctuation of a load, the rotating speed of the drum or the moving speed of the imaging system undergoes a fluctuation which critically deteriorates the resolution of the copier or invites jittering.

An expedient hitherto proposed to settle this problem employs separate drive lines for the drum and imaging systems, respectively. Each of these drive lines is associated with a speed control line which is independent of the other but supplied with reference signals from a common reference oscillator. More specifically, the drum or the imaging system is driven by its own phase locked loop which comprises a phase comparator, an amplifier, a servo motor and an encoder. Though free from the drawback attributable to the use of a single drive source, this expedient requires a disproportionate cost since each of the drum drive line and imaging system drive line must be provided with an exclusive feedback control.

The increase in cost may be avoided by another known expedient which controls the movement of the imaging system based on the movement of the drum. According to this expedient, whereas the drum is driven by a main motor, the imaging system is driven through a phase locked loop as in the first expedient which is electrically connected with an encoder associated with the drum. While such an expedient succeeds in simplifying the construction of the control system to reduce the cost, it still entails a drawback that a fluctuation of a load is directly reflected by that of the main motor, since the main motor drives not only the motor but other various sections of the printer in sequence. With this in view, the movement of the imaging system must be so controlled as to well follow substantial variations in the drum speed. However, the second expedient can not offer such a control but, rather, creates a substantial relative variation in speed between the drum and the imaging system with the resultant degradation to the quality of reproduced images.

SUMMARY OF THE INVENTION

It is an object of the present invention to provide a driving method and apparatus for driving an illumination type imaging system, thereby eliminating all the drawbacks inherent in the prior art apparatuses.

It is another object of the present invention to provide a driving method for driving a reciprocating illumination type imaging system in synchronism with a moving photoconductive member in electrostatic photography.

It is another object of the present invention to provide a driving apparatus for driving reciprocating illumination type imaging system in synchronism with a moving photoconductive member in an electrostatic copying machine.

It is another object of the present invention to provide a generally improved driving method and apparatus for an illumination type imaging system.

In accordance with the present invention, a reciprocating imaging system is driven by a first drive source and a moving photoconductive member is driven by a second drive source. A time period necessary for the photoconductive member to move a given distance is measured. The measured time period is compared with a predetermined reference period to thereby estimate a fluctuation component in the time period of movement of the photoconductive member in accordance with a result of the comparison. A buildup target speed during a buildup scanning speed motion of the imaging system and a constant target speed during a constant scanning speed motion of the imaging system are preset or determined in accordance with the estimated fluctuation component.

The imaging system comprises an optical lens having a given focal length. The first and second drive sources constitute a drive mechanism. The preset buildup target speed and/or the preset constant target speed is compensated in conformity with a deviation of the focal length of the lens from a nominal focal length and a deviation of the mechanical precision of the drive mechanism from a nominal mechanical precision. Further, the speed of the imaging system during a constant scanning speed motion is detected and the preset constant target speed is compensated in accordance with the detected speed of the imaging system.

Other objects, together with the foregoing, are attained in the embodiment described in the following description and illustrated in the accompanying drawings.

BRIEF DESCRIPTION OF THE DRAWINGS

FIGS. 3, 3a and 3b comprise a block diagram showing a driving apparatus embodying the present invention;

FIGS. 4a to 4c illustrate various combinations of a light intercepting plate and a photointerrupter;

FIG. 5 is a perspective view of an exemplary illumination type imaging system;

DESCRIPTION OF THE PREFERRED EMBODIMENT

While the driving method and apparatus for an illumination type imaging system of the present invention is susceptible of numerous physical embodiments, depending upon the environment and requirements of use, substantial numbers of the herein shown and described embodiment have been made, tested and used, and all have performed in an eminently satisfactory manner.

Figure 1:
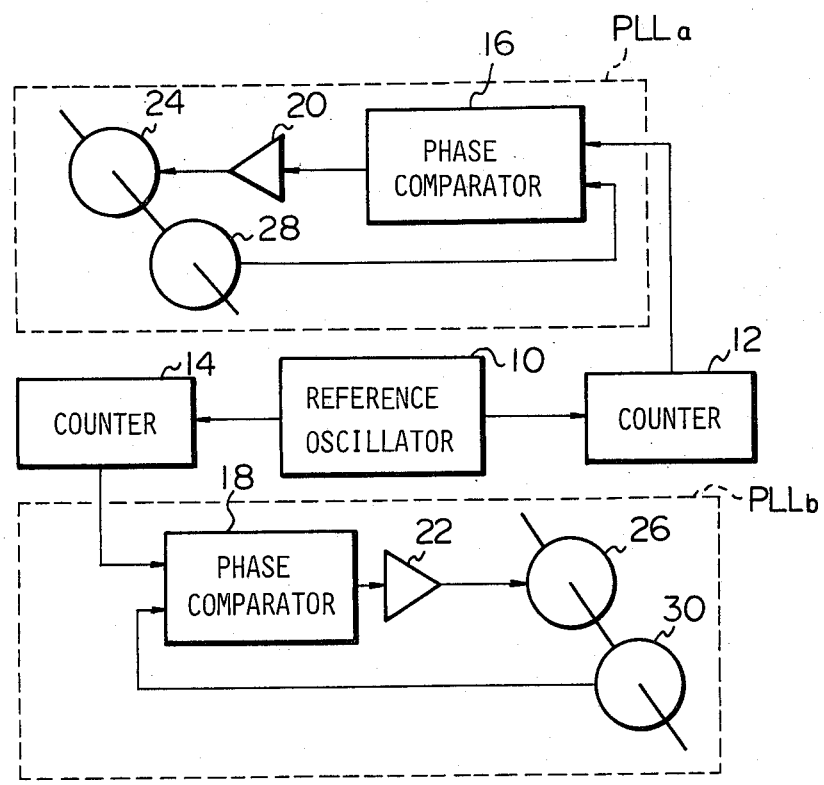
FIG. 1 is a block diagram showing a prior art apparatus for driving an illumination type imaging system.

Referring to FIG. 1 of the drawings, a prior art driving apparatus comprises a reference oscillator 10, counters 12 and 14 for frequency conversion (frequency dividers), phase comparators 16 and 18, amplifiers 20 and 22, servo motors 24 and 26 and encoders 28 and 30. The phase comparator 16, amplifier 20, servo motor 24 and encoder 28 constitute a phase locked loop $PLL_a$ which is associated with a photoconductive drum (not shown). This phase locked loop $PLL_a$ is supplied with an output of the counter or frequency divider 12 which is in turn supplied with an output of the reference oscillator 10. Likewise, the phase comparator 18, amplifier 22, servo motor 26 and encoder 30 constitute a second phase locked loop $PLL_b$ which is associated with an imaging system. The output of the common oscillator 10 is coupled to the counter or frequency divider 14 whose output is connected to the phase locked loop $PLL_b$. With this construction, while a reciprocating mechanism of the imaging system is in a constant speed motion, the motor 24 for driving the drum and the motor 26 for driving the imaging system can operate in synchronism with each other.

This prior art apparatus shown in FIG. 1 is free from the previously discussed drawback originating from the use of a single drive source for the drum and imaging system, offering quality reproduction of desired images. However, the independent phase locked loops for discrete feedback controls are undesirable from the standpoint of economy.

Figure 2:
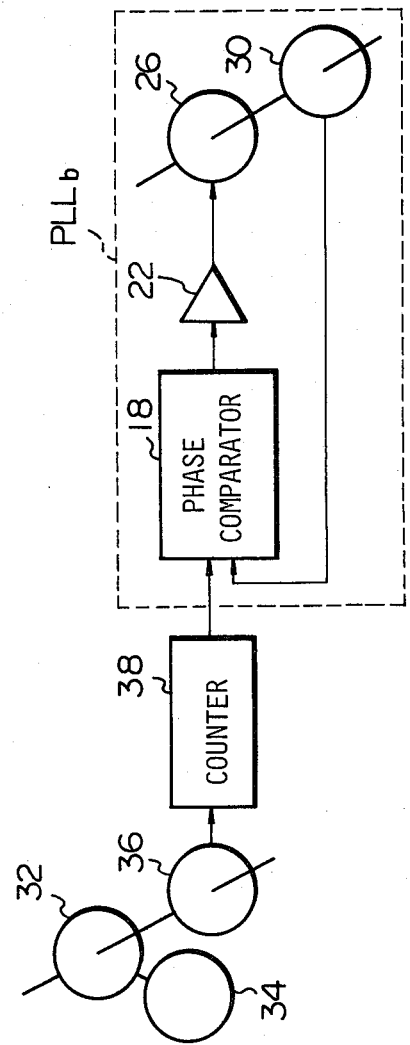
FIG. 2 is a block diagram showing an alternative prior art driving apparatus.

Referring to FIG. 2, there is shown another prior art driving apparatus which is more economical than the apparatus of FIG. 1. In FIG. 2, whereas a photoconductive drum 32 is driven by a main motor 34, an imaging system is caused into a controlled movement which is subordinate to the movement of the drum 32. Associated with the drum 32 is an encoder 36 whose output is coupled to a counter or frequency divider 38 whose output is in turn coupled to a phase locked loop $PLL_b$ common to the phase locked loop $PLL_b$ of FIG. 1.

The apparatus of FIG. 2 thus simplifies the control system and thereby cuts down the cost but still permits the main motor 34 to fluctuate in operating speed in accordance with a fluctuation in a load. This is because, apart from the drum 32, the main motor 34 drives various component sections of the printer in sequence during a copying cycle of the copying machine. Thus, the apparatus of FIG. 2 should allow a control on the movement of the imaging system to well follow any substantial fluctuation in the moving speed of the drum. However, in view of the inertia of the imaging system and the large mechanical time constant determined by the servo motor 26, such an apparatus cannot be expected to control the movement of the imaging system well following a fluctuation in the speed of the drum but, rather, it tends to create a significant variation in relative speed between the drum and the imaging system. The result is the degradation to the quality of reproduced images.

Figure 3A:
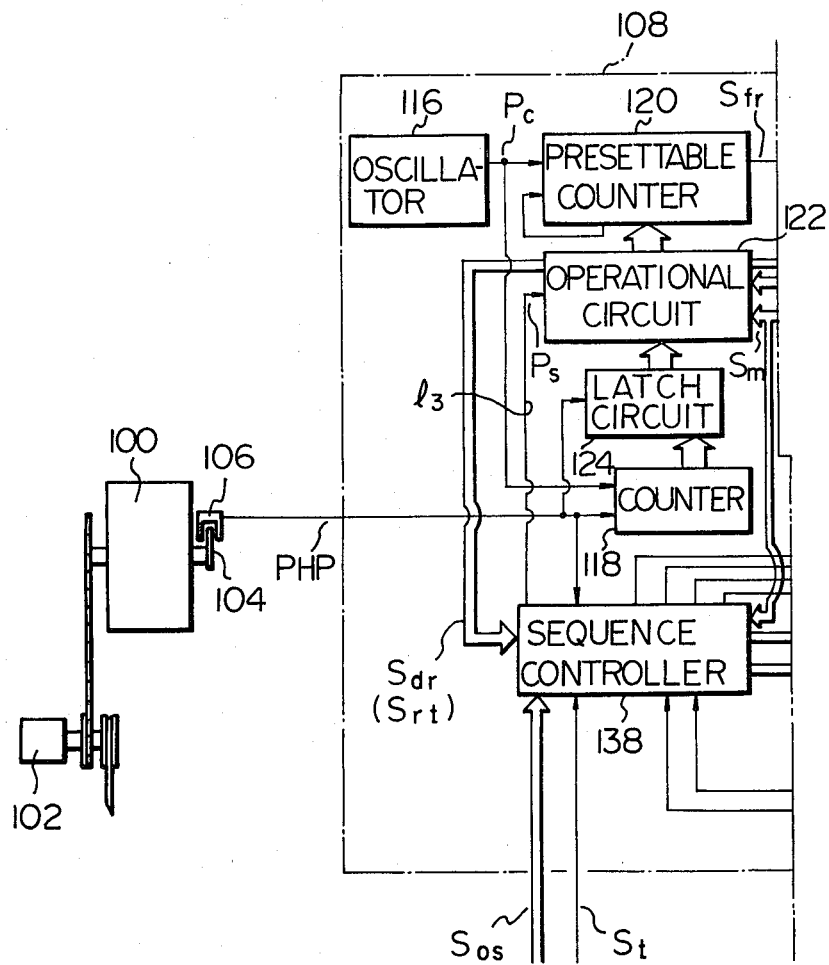
Figure 3B:
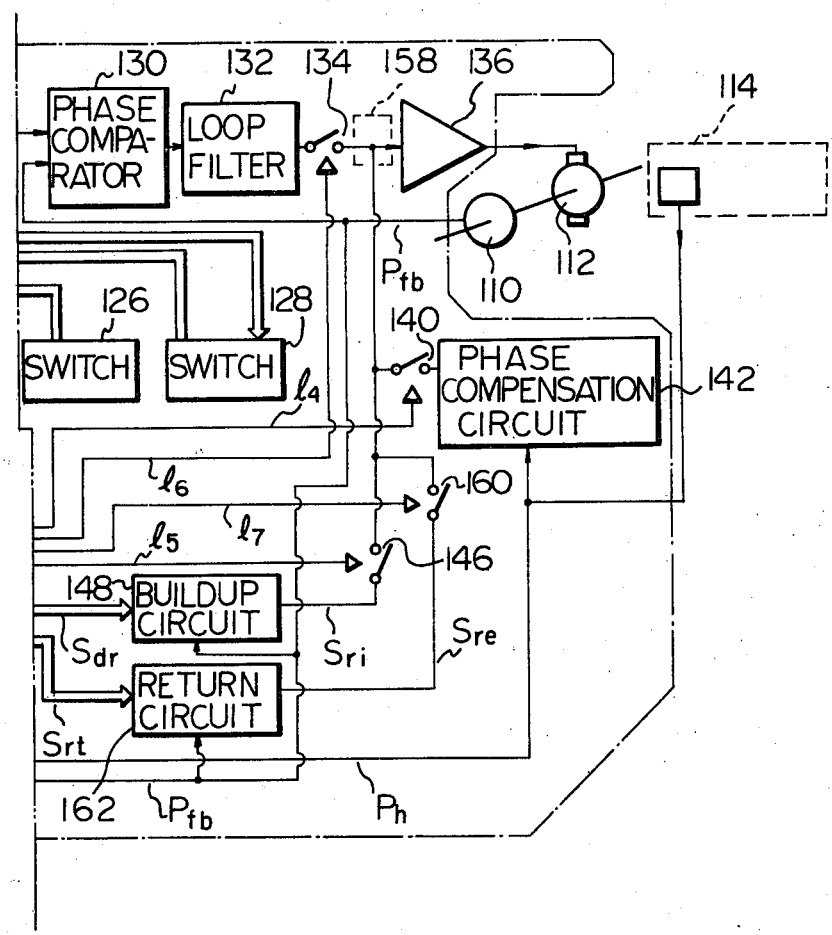

Referring now to FIG. 3, a driving apparatus embodying the present invention is shown which is applied to an electrostatic copying machine by way of example. The copying machine includes a photosensitive drum 100 and a main motor 102 for driving the drum 100 and other component parts of the machine as usual. A light intercepting plate 104 is rigidly connected to the drum 100 to cooperate with a photointerrupter 106 which is mounted on a stationary frame member of the machine (not shown). The photointerrupter 106 comprises a light emitting element and a light receiving element. There are also shown a control circuit 108, an encoder 110, a servo motor 112 and an illumination type imaging system 114 which the apparatus of the present invention is to drive.

During rotations of the drum 100, the light intercepting plate 104 rotating with the drum 100 intercepts the optical path between the light emitting and receiving elements 106 repeatedly at a predetermined angular position of the drum. The photointerrupter 106 therefore supplies the control circuit 108 with a train of pulses PHP each representing the predetermined drum angular position.

Various combinations of the light intercepting plate 104 and photointerrupter 106 are illustrated in FIGS. 4a to 4c. In FIGS. 4a and 4b, use is made of one photointerrupter 106 and one light intercepting plate 104 while, in FIG. 4c, use is made of two photointerrupters $106_1$ and $106_2$ and one light intercepting plate 104. The or each photointerrupter 106 produces a train of pulses PHP each corresponding to a given angular position of the drum 100 which is dependent on the shape of the light interceptor 104 and the position of the photointerrupter 106, as the drum 100 is driven for rotation by the main motor 102. It will be seen that the number and arrangement of photointerrupters 106 and the shape of the light interceptor 104 are suitably selectable depending on the specific desired angular position or positions of the drum 100.

Referring to FIG. 5, there is shown an example of the illumination type imaging system 114 which is driven for reciprocation by the servo motor 112 (FIG. 3). The imaging system 114 includes a wire 202, turn pulleys 204 and 206, a mirror pulley 208 and a pulley 210. The imaging system 114 also comprises a first mirror 212, a second mirror 214, a light intercepting plate 216, a first photointerrupter 218 responsive to a home position of the system, and a second photointerrupter 220 located at a specific distance from the home position photointerrupter 218. The first mirror 212, light intercepting plate 216 and the like are connected with the wire 202 by a wire clamp 222. The second mirror 214 is pivotally connected to the mirror pulley 208. During exposure, the imaging system 114 causes the first mirror 212 to move at a speed corresponding to the peripheral speed of the drum 100 and the second mirror 214 at a speed one half the speed of the first mirror 212.

Now, the driving apparatus of the present invention drives the imaging system 114 while preventing it from following any fluctuation in the actual rotating speed of the drum. A procedure for attaining this purpose consists in measuring a time period necessary for the drum 100 to rotate a predetermined angular distance, comparing the measured actual time period with a given reference time period, estimating a fluctuation component of the actual time period for the predetermined angle of rotation which may occur when the reciprocating mechanism of the imaging system scans a document, presetting on the basis of the estimated fluctuation component a target speed for a buildup motion and/or a constant speed motion of the reciprocating mechanism, and actuating the servo system so that the imaging system may move at the preset target speed. Such a function of the driving apparatus will be described with reference also to FIG. 3.

The pulses PHP produced from the photointerrupter 106 during repeated rotations of the drum 100 have a period or duration which depends on the rotating speed of the drum 100. Therefore, if the period or duration of the pulses PHP produced from the photointerrupter 106 is held in correspondence with a given angle of movement of the drum 100, the time period necessary for the drum 100 to rotate the given angle can be determined by measuring the period or duration of the pulses PHP. As well known in the art, the period or duration of the pulses PHP can be readily measured by counting pulses the repetition period of which is far shorter than that of the pulses PHP.

In FIG. 3, the control circuit 108 includes an oscillator 116 which generates clock pulses $P_c$ having a repetition period which is far shorter than that of the output pulses PHP of the photointerrupter 106. These clock pulses $P_c$ are coupled to a counter 118 and a presettable counter 120. The counter 118 is reset by an output pulse PHP of the photointerrupter 106. The number "N" of clock pulses $P_c$ counted by the counter 118 for one period of the pulses PHP indicates a time period which the drum 100 took to rotate the predetermined angle.

Suppose that "$N_o$" clock pulses $P_c$ were counted during one period of the pulses PHP while the drum 100 was rotating at a reference or standard speed without any fluctuation in the speed, and that a count attributable to a fluctuation component of the drum speed is "$\Delta N$". Then, the count N of the clock pulses $P_c$ is expressed as:

$$N = N_o + \Delta N = N_o \left(1 + \frac{\Delta N}{N_o}\right) \quad \text{Eq. (1)}$$

Where the magnification ratio is denoted by m and the preset speed of the imaging system at a magnification ratio m=1 is denoted by $V_o$, a preset speed V of the imaging system is expressed as:

$$V = \frac{1}{m} V_o \quad \text{Eq. (2)}$$

Even though the motor 100 may be operated at a predetermined speed, the imaging system 114 is caused to move at a speed different from its standard speed (preset speed $V_o$) if various components in the power delivery path thereto involve deviations in mechanical precision. Accordingly, the motor rotation speed needs be varied to compensate for a fluctuation component in speed which originates from the irregular precision distributions of the component parts. As such will be readily understood by considering possible deviation of the actual diameter of the pulleys shown in FIG. 5 from a nominal diameter or that of the actual diameter of the wire 202 from a nominal diameter.

Apart from such dimensional irregularity of various parts, the rotation speed of the motor has to be compensated in accordance with deviation of an actual focal length of a lens in an imaging system from a nominal focal length. Compensation in this aspect will be described with reference to FIG. 10.

Figure 10:
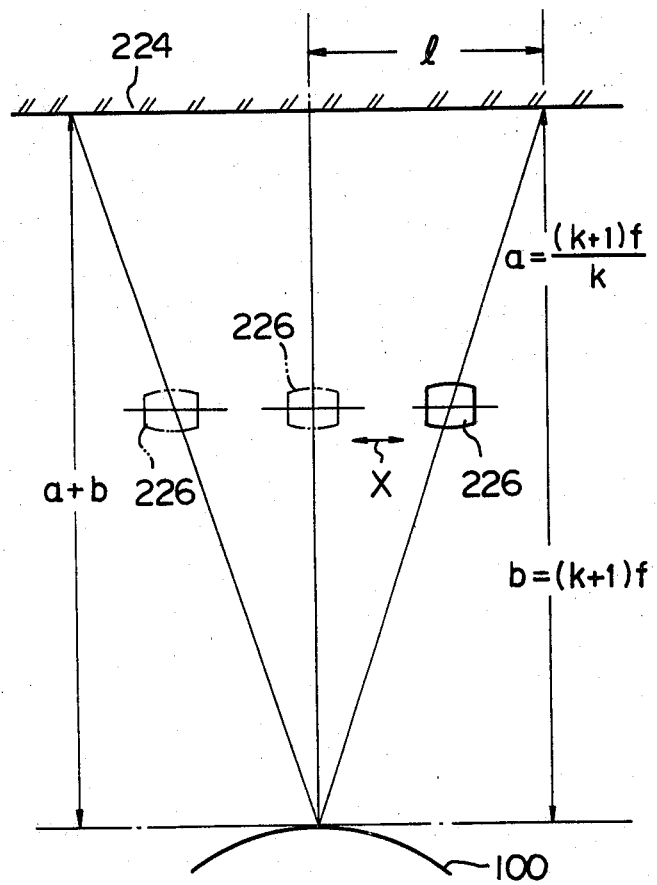
FIG. 10 illustrates the deviation of actual focal length of a lens in the present invention.

Referring to FIG. 10, there are shown the drum 100, a document surface 224 and a lens 226. Various relations discussed hereinafter will hold in a movable lens type imaging system.

First, a condition for an image on the document surface 224 to be desiredly formed on the surface of the drum 100 is represented by:

$$\frac{1}{a} + \frac{1}{b} = \frac{1}{f} \quad \text{Eq. (a)}$$

where a denotes the distance between the document surface 224 and the lens 226, b the distance between the lens 226 and the drum 100, and f the focal length of the lens 226.

Expressing the magnification b/a as k, the distance (a+b) between the document surface 224 and the drum 100 is indicated by:

$$a + b = \frac{(k + 1)^2}{k} f \quad \text{Eq. (b)}$$

From the relation l:(a+b)=X:b, there holds an equation:

$$X = \frac{bl}{a + b} = \frac{k}{k + 1} l \quad \text{Eq. (c)}$$

Suppose that the actual focal length f of the lens 226 is different from its nominal focal length. Despite such deviation, an image of a selected magnification can be formed on the drum 100 only if the distances a and b are adjusted; this adjustment does not accompany any change in the distance X included in the equation (c). In practice, however, a difficulty is experienced in adjusting the distances a and b in conformity with the focal length f of the lens 226. A common practice is therefore to adjust the distance a between the lens 226 and the document surface 224 until the focus is taken on the drum 100. The adjustment of the distance a requires a change in distance X in accordance with the F number of the lens 226 as will be seen from Equation (c). Stated another way, the moving or scanning speed of the imaging system must be varied in conformity with the deviation of the actual focal length f of the lens 226 from a nominal focal length so that a predetermined width of document may be scanned by the imaging system.

Therefore, an initial reference speed v which should be determined as a final target speed in the imaging system is expressed as:

$$v = V + \Delta V_m = \frac{1}{m} V_o + \Delta V_m = \frac{V_o}{m}\left(1 + \frac{m\Delta V_m}{V_o}\right) \quad \text{Eq. (3)}$$

where V is a reference scanning speed determined by Equation (2) and $\Delta V_m$ is an adjustment component in speed for each magnification ratio (m indicating a reference magnification ratio).

In determining the initial reference speed v, there should also be considered a possible fluctuation in the rotation speed of the drum 100. Since the count N is inversely proportional to the drum speed, the reference speed v can be expressed as follows from Equations (1) and (3):

$$v = \frac{V_o}{m} \cdot \frac{1 + \frac{m\Delta V_m}{V_o}}{1 + \frac{\Delta N}{N_o}} \quad \text{Eq. (4)}$$

The number $N_o$ of clock pulses in Equation (4) is stored in an operational circuit 122 of FIG. 3. The count $\Delta N$ on the other hand is provided by the operational circuit 122 as $\Delta N = N - N_o$; the count N in the counter 18 is latched by a latch circuit 124 which is supplied with pulses PHP as latch pulses, and coupled to the operational circuit 122.

A group of switches 126 are mainpulatable to supply the operational circuit 122 with a numerical value which represents a designated magnification ratio m. Also, a group of switches 128 are manipulatable to supply the operational circuit 122 with an amount of speed adjustment $\Delta V_m$ for each time of magnification ratio as a necessary initial setting condition. Hence, the operational circuit 122 can easily perform Equation (4) to provide the initial reference speed v.

Figure 6:
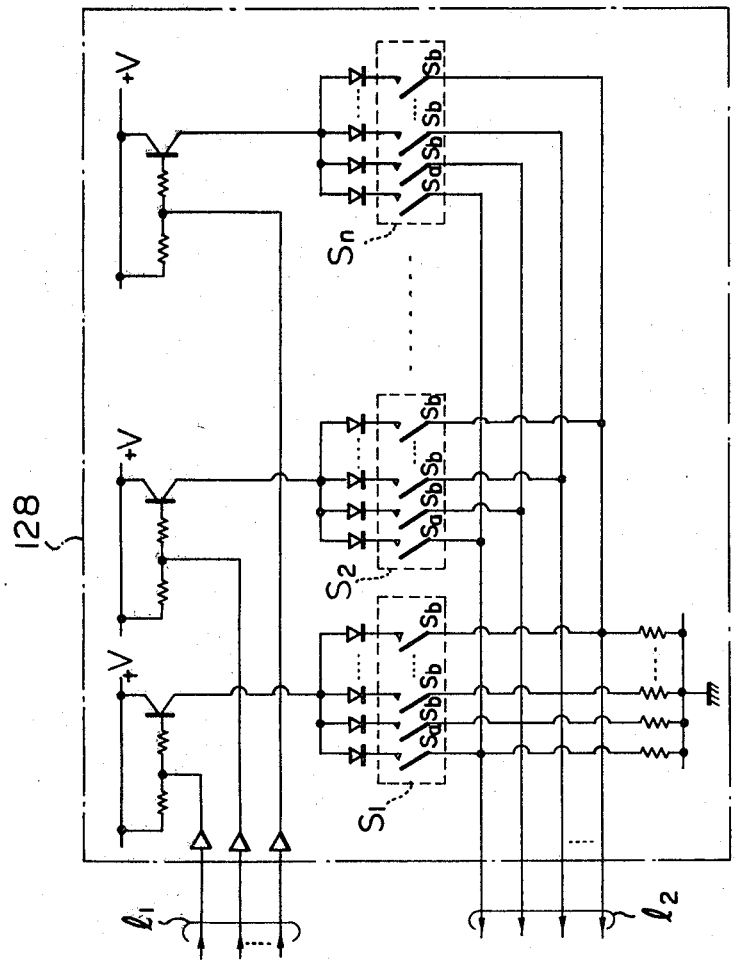
FIG. 6 is a circuit diagram showing an example of a group of switches for setting initial conditions.

The switch group 128 for setting the initial condition may be constructed as shown in detail in FIG. 6. The switch group 128 in FIG. 6 is made up of a plurality of switch arrays $S_1, S_2 \ldots S_n$ each corresponding to a specific magnification ratio. In each switch array S, a switch $S_a$ is used to designate a direction of compensation and a plurality of switches $S_b, S_b \ldots$ are used for data designation. The switch group 128 is supplied with an output signal of the operational circuit 122 through lines $l_1$ which designates a magnification ratio. The switch group 128 in turn supplies the operational circuit 122 with a compensation code through lines $l_2$.

In the illustrated embodiment, the switch arrays $S_1$, $S_2 \ldots S_n$ are assumed to have correspondence with the magnification ratio m which are "1, 0.82 ... 0.65", respectively. However, where the copying machine can maintain the irregularity of its lens and mechanical components unchanged regardless of any variation in the magnification ratio, only one switch array will suffice and it is naturally needless to supply the switch group 128 with information from the operational circuit 122 via the line $l_1$.

In FIG. 3, a phase locked loop is constituted by a phase comparator 130, a loop filter 132, a switch 134, an amplifier 136, the servo motor 112 and the encoder 110. This phase locked loop is adapted to control the imaging system 114 to move at a constant speed according to a reference signal during a scanning stroke of the imaging system. Therefore, the moving speed of the imaging system 114 can be varied by varying the repetition frequency $f_r$ of reference pulses which are supplied from the presettable counter 120 to the phase comparator 130 as a reference signal $S_{fr}$.

The reference pulses are coupled to the phase comparator 130 to determine an initial reference speed v of the imaging system which is indicated by Equation (4). The repetition frequency $f_r$ of the reference pulses is expressed as:

$$f_r = \frac{\alpha V_o}{m} \cdot \frac{1 + \frac{m\Delta V_m}{V_o}}{1 + \frac{\Delta N}{N_o}} \quad \text{Eq. (5)}$$

where $\alpha$ is a proportional constant.

Where the reference pulses having the repetition frequency $f_r$ indicated by Equation (5) are prepared by dividing at the presettable counter 120 the frequency of output clock pulses $P_c$ of the oscillator 116 whose repetition frequency is $f_c$, the count or frequency division ratio W at the presettable counter 120 is related with the repetition frequencies $f_r$ and $f_c$ as:

$$f_r = \frac{f_c}{w} \quad \text{Eq. (6)}$$

From Equations (5) and (6), $$W = \frac{m\left(1 + \frac{\Delta N}{N_o}\right)}{\alpha V_o \left(1 + \frac{m\Delta V_m}{V_o}\right)} f_c \quad \text{Eq. (7)}$$

Since $m\Delta V_m / V_o \ll 1$, Equation (7) may be rewritten as:

$$W = \frac{m}{\alpha V_o}\left(1 + \frac{\Delta N}{N_o}\right)\left(1 - \frac{m\Delta V_m}{V_o}\right) f_c$$

Since $\Delta N / N_o \ll 1$, $$W = \frac{m}{\alpha V_o}\left(1 + \frac{\Delta N}{N_o} - \frac{m\Delta V_m}{V_o}\right) f_c \quad \text{Eq. (8)}$$

Suppose that the count at the presettable counter 120 is $W_o$ under the conditions that the magnification is 1:1, the drum 100 is moving at a speed $V_o$ as expected, each lens has a focal length equal to a nominal focal length, and each mechanical element has a precision equal to a nominal precision. Then, since m in Equation (8) is "1" and $\Delta N$ and $\Delta V_m$ are "0", the count $W_o$ is expressed as:

$$W_o = \frac{f_c}{\alpha V_o} \quad \text{Eq. (9)}$$

Accordingly, the count W is expressed as:

$$W = m\left(1 + \frac{\Delta N}{N_o} - \frac{m\Delta V_m}{V_o}\right) W_o \quad \text{Eq. (10)}$$

$$= mW_o + \frac{mW_o}{N_o}\Delta N - \frac{m^2W_o}{V_o}\Delta V_m$$

Thus, in order that an image may be obtained without any error in magnification regardless of a change in drum speed, deviation of lens focal length f or deviation of mechanical element precision, the count W (frequency division ratio W) of the reference pulses at the presettable counter 120 which are coupled to the phase comparator 130 as reference signals $S_{fr}$ must be varied such that their repetition frequency $f_r$ has a variable value determined by such a drum speed fluctuation, or lens focal length or mechanical precision deviation.

The presettable counter 120 in FIG. 3 is supplied with a result of calculation represented by Equation (10) from the operational circuit 122 as a numerical value to be preset therein. In the arrangement of FIG. 3, every time the presettable counter 120 produces a borrow signal, it is preset to a numerical value provided by Equation (10) at the operational circuit 122. The calculation according to Equation (10) at the operational circuit 122 covers even the fluctuation component $\Delta N$ of the drum speed and the fluctuation component $\Delta V_m$ of the imaging system speed attributable to the deviation in the focal length f of the lens for each selected magnification ratio m and that in the mechanical precision of various parts and elements. It will thus be seen that the numerical value W resulting from the calculation at the operational circuit 122 has any error attributable to such fluctuation components $\Delta N$ and $\Delta V_m$ compensated for when it is preset in the counter 120.

In FIG. 3, the presettable counter 120 is shown to comprise a decrement type counter in which a numerical value from the operational circuit 122 is preset every time the counter produces a borrow signal. It will be apparent, however, that use may be made of a counter which is reset every time the count coincides with a numerical value preset therein. The gist of the presettable counter 120 is that it operates with a frequency division ratio which is a numerical value supplied from the operational circuit 120 and produces a necessary repetition frequency $f_r$.

The operational circuit 122 starts the calculation in response to a calculation start signal $P_s$ coupled thereto from a sequence controller 138 via a line $l_3$. Of the various numerical values necessary for the calculation of Equation (10) at the operational circuit 122, the magnification ratio m is supplied to the operational circuit 122 from the previously stated switch group 126; the velocity adjustment component $\Delta V_m$ for each magnification ratio is supplied to the operational circuit 122 from the switch group 128; the count $N_o$ corresponding to the reference or standard drum rotation speed and the frequency division ratio $W_o$ under the reference or standard operation conditions are stored in the operational circuit 122; and the count $\Delta N$ corresponding to a fluctuation component in the drum speed is provided by the operational circuit 122 through a calculation $(N - N_o) = \Delta N$, where N is a numerical value supplied from the latch circuit 124 and $N_o$ a numerical value stored in the operational amplifier 122.

In the above description, a numerical value fed from the switch group 128 to the operational circuit 122 indicates a velocity adjustment component $\Delta V_m$ for each magnification ratio. To promote easy calculation at the operational circuit 122, it is desirable that the switch group 128 is constructed such that the numerical value from the switch group 128 to the operational circuit 122 corresponds to $m^2W_o/V_o \cdot \Delta V_m$ in Equation (10).

Numerical values $mW_o$ in Equation (10) may be stored in advance in the operational circuit 122. Additionally, numerical value $mV_o/N_o \cdot \Delta N$ may be calculated for all the combinations of all the m and $\Delta N$ in presumable ranges of the latter, and stored in advance in the operational circuit 122. These will prove effective to shorten the time period consumed by the operational circuit 122 for the calculation. In this case, it will be apparent that the range of $\Delta N$ should correspond at least to a range of speed fluctuations which are expected to occur at the drum 100. While the data to be stored in the operational circuit 122 may comprise $mW_o/N_o$ calculated for each magnification ratio, as such is undesirable in view of the longer time period than that necessary for the previously mentioned $mW_o/N_o \cdot \Delta N$.

As described so far, the operational circuit 122 performs the calculation of Equation (10) within a short period of time in response to a calculation start signal $P_s$ from the sequence controller 138. A numerical value indicating a given frequency division ratio W (count W) is supplied from the operational circuit 122 to the presettable counter 120.

The sequence controller 138 is supplied with an operation start signal $S_t$, a signal $S_{os}$ indicating a size of an original document or that of a recording medium as the case may be, an output signal $P_h$ of the photointerrupter 218 (FIG. 5) responsive to the home position of the imaging system, an output signal $P_{fb}$ of the encoder 110, an output signal $S_m$ of the switch group 126, a pulse train PHP, and a start or buildup target signal $S_{dr}$ or a return target signal $S_{rt}$ output from the operational circuit 122. In response to these signals, the sequence controller 138 sequentially controls the individual component elements of the control circuit 108.

In an initial stage of operation, the sequence controller 138 supplies a control signal to a switch 140 via a line $l_4$ to close it so that the imaging system is accurately located in its home position. For this control, there may be employed a known means which locates the imaging system with the home position signal $P_h$ to position the light interceptor 216 (FIG. 5) at the center of the home position photointerrupter 218.

The reference numeral 142 in FIG. 3 designates a phase compensation circuit.

When the sequence controller 138 receives an operation start signal $S_t$ from the outside and then a pulse PHP from the photointerrupter 106, it supplies a switch 146 with a control signal via a line $l_5$ to close it and the switch 140 with a control signal to open it.

At this moment, the counter 118 counts clock pulses $P_c$ supplied thereto from the oscillator 116. The count N of the clock pulses, which represents a time period consumed by the drum 100 to rotate a predetermined angle, is latched in the latch circuit 124 and coupled therefrom to the operational circuit 122. It will be noted that the timing to latch the count of the counter 118 in the latch circuit 124 is open to choice except for the specific period for which the operational circuit 122 performs calculation. That is, during operation of the circuit 122, latch pulses must be gated to prevent an output of the latch circuit 124 from being fluctuated.

Upon the closing of the switch 146, a start signal $S_{ri}$ output from a start or buildup circuit 148 is passed through the switch 146 to the amplifier 136 to energize the servo motor 112. An exemplary arrangement of the start or buildup circuit 148 is shown in FIG. 7.

Figure 7:
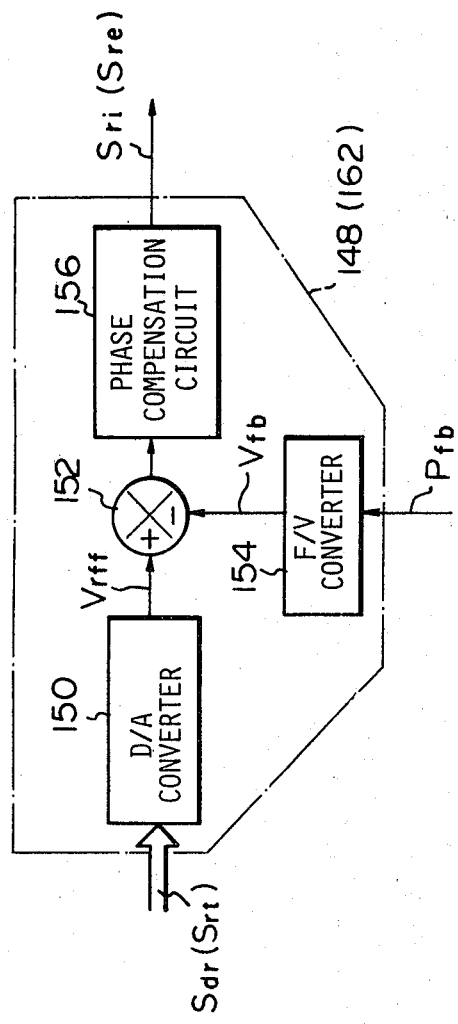
FIG. 7 is a block diagram showing an example of a buildup circuit or a return circuit.

Referring to FIG. 7, the start circuit 148 comprises a digital-to-analog converter 150, a subtractor 152, a frequency-to-voltage converter 154 and a phase compensation circuit 156. The digital-to-analog converter 150 processes an input buildup target signal $S_{dr}$ into an analog target speed reference voltage $V_{rff}$ and supplies this voltage to the subtractor 152. The frequency-to-voltage converter 154 supplies the subtractor 152 with a voltage $V_{fb}$ provided by frequency-to-voltage conversion of an output signal $P_{fb}$ of the encoder 110. Then, the subtractor 152 produces a signal representing a difference between the two voltages $V_{rff}$ and $V_{fb}$. The phase compensation circuit 156 subjects the output signal of the subtractor 152 to necessary phase compensation to prepare a start signal $S_{ri}$, which is an output signal of the start circuit 148.

The buildup target signal $S_{dr}$ coupled to the digital-to-analog converter 150 is prepared by the operational circuit 122 and fed to the start circuit 148 via the sequence controller 138. The phase compensation circuit 156 in the start circuit is constructed as a phase advancing circuit or a phase retarding circuit, for example, and so designed as to prevent the imaging system from overshooting at a start of its operation.

The start circuit 148 functions to increase the moving speed of the imaging system smoothly up to an approximate target speed. The target speed in the start circuit 148 may be preset (1) on the assumption that the drum 100 is rotating at a reference or standard speed or (1) on the assumption that compensation has been carried out for a fluctuation in drum speed and a speed fluctuation attributable to deviations in lens focal distance and mechanical precision.

A target speed at a buildup stage may become deviated a great deal from a final target speed predetermined for the imaging system, that is, a target speed with the fluctuation components in speed compensated for. Under this condition, the target speed if determined in the manner (1) would make transition from a buildup mode to a constant speed mode non-smooth causing the imaging system to take a prolonged period of time to reach the final target speed. In other words, the buildup time of the imaging system would be prolonged.

Figure 8:
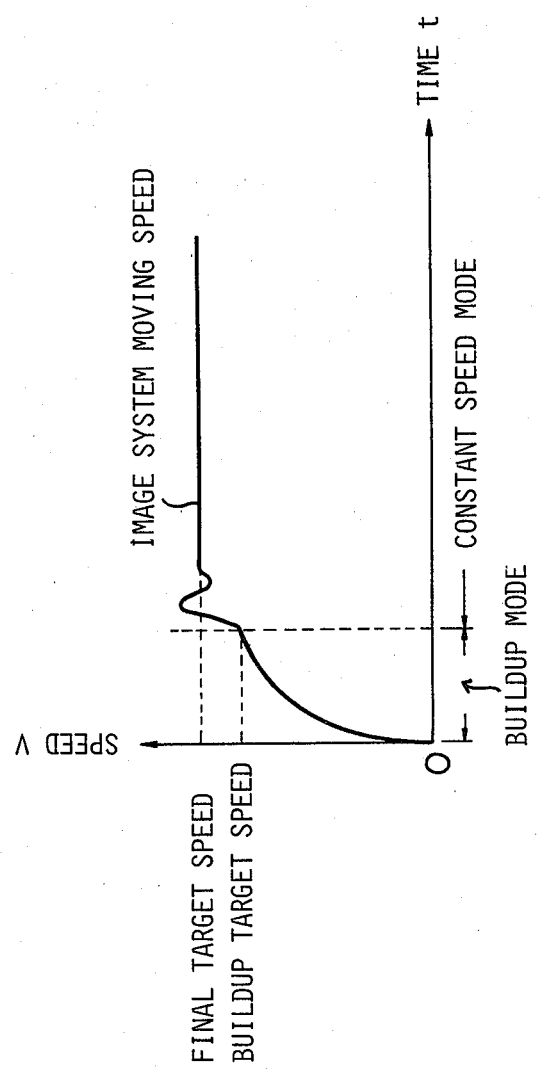
FIG. 8 shows a curve representing a variation in the scanning speed of an imaging system.

FIG. 8 shows a curve which demonstrates an exemplary variation in the moving speed of the imaging system which occurs when the target speed differs from a buildup mode to a constant speed mode.

It will be seen from the above that setting a buildup or start target speed in the manner (2) would promote a favorable buildup action of the imaging system controlled by the start circuit 148.

Where a target speed is set in the manner (2), it is only necessary to obtain an equation $$v = \frac{V_o}{m}\left(1 + \frac{m\Delta V_m}{V_o} - \frac{\Delta N}{N_o}\right) \quad \text{Eq. (11)}$$

from Equation (4), prepare at the operational circuit 122 a buildup target signal $S_{dr}$ which is given by multiplying Equation (11) by a constant $\beta$ as $$S_{dr} = \beta v = \beta \frac{V_o}{m}\left(1 + \frac{m\Delta V_m}{V_o} - \frac{\Delta N}{N_o}\right), \quad \text{Eq. (12)}$$

and supply the buildup target signal $S_{dr}$ to the start circuit 148.

It will be analogically understood from the foregoing description that the target signal $S_{dr}$ can be readily obtained through Equation (12) at the operational circuit 122. Therefore, no detailed description will be made in this respect.

While the imaging system is in a buildup or starting action, the operational circuit 122 is supplied with a calculation start signal $P_s$ from the sequence controller 138 via the line $l_3$. Then, the operational circuit starts the previously stated calculation and, within a predetermined period of time, it completes the calculation and delivers a result of the calculation to the presettable counter 120. The presettable counter 120 divides the frequency of input clock pulses $P_c$ with a ratio designated thereto in the manner described. The output signal $S_{fr}$ of the counter 120 having a given repetition frequency $f_r$ is coupled to the phase comparator 130.

The sequence controller 138 controls the imaging system to move at a target speed in either one of two different modes: a phase locked loop mode in which the switch 146 is opened by a control output of the sequence controller 138 via the line $l_5$ while the switch 134 is closed via a line $l_6$, and a combined phase locked loop and speed control mode in which the switch 134 is closed with the switch 146 kept closed. Either the phase locked loop mode or the combined phase locked loop and speed control mode may be selected as desired for the control of the imaging system. However, the combined phase locked loop and speed control mode is advantageous over the phase locked loop mode in promoting stable operations of the imaging system.

In the phase locked loop mode, the phase locked loop made up of the phase comparator 130, loop filter 132, switch 134, amplifier 136, servo motor 112 and encoder 110 functions to cause the frequency of an output signal $P_{fb}$ of the encoder 110 into coincidence with the frequency of the reference signal $S_{fr}$, which is coupled from the presettable counter 120 to the phase comparator 130. Thus, the imaging system 114 is allowed to travel at a target speed.

In the combined phase locked loop and speed control mode, a speed control is performed by a loop made up of encoder 110, start circuit 148, amplifier 136 and servo motor 112 in addition to the control carried out in the phase locked loop mode. In this mode, an adder 158 is connected between the switch 134 and the amplifier 136 as indicated by a phantom line in FIG. 3 so as to be supplied with signals through the switches 134 and 146. This control mode improves the stability of constant speed operation of the system since the phase locked loop is supplied with an output signal $S_{ri}$ of the start circuit 148 which contains a signal component provided by frequency-to-voltage conversion of an output $P_{fb}$ of the encoder 110 which is proportional to a speed; the phase locked loop being seemingly fed back with a speed.

While the imaging system travels at a constant speed under the phase locked loop control mode or the combined mode, the sequence controller 138 counts output pulses $P_{fb}$ of the encoder 110. As the count at the encoder 110 coincides with a signal $S_{os}$ indicating a document size, the sequence control, determining that a scan has ended, opens the switch 134 via the line $l_6$ if under the phase locked loop control mode while, if under the combined mode, it opens the switch 134 via the line $l_6$ and the switch 146 via the line $l_5$. Additionally, in either mode, the sequence controller 138 closes a switch 160 supplying a control signal through a line $l_7$.

When the switch 160 is thus closed, the imaging system strokes back to its home position actuated by a return circuit 162.

The return circuit 162 may be constructed in the same way as the start circuit 148 as illustrated in FIG. 7. Where the circuitry of FIG. 7 is employed to construct the return circuit 162, a return target signal $S_{rt}$ coupled from the sequence controller 138 to the return circuit 162 will be provided with a characteristic to lower the target speed reference voltage $V_{rff}$ progressively as the imaging system approaches the home position. It will be needless to mention that the polarity of the output of the return circuit 162 is opposite to that of the start circuit 148 and, therefore, the return circuit 162 has to be designed taking this into account.

As the return stroke of the imaging system 114 proceeds until it neighbors the home position, the switch 160 is opened and the switch 140 is closed to establish a stop mode. Then, the imaging system is controlled to stop at a position where the light interceptor 216 (FIG. 5) becomes located at the center of the photointerrupter 218 (FIG. 5).

One control cycle of the driving apparatus is completed in this way. It will be seen that the operational circuit 122, sequence controller 138 and other various functions are readily achievable using a single microcomputer (including a random access memory, a read only memory and an I/O port). In the foregoing description, a fluctuation in drum speed has been described as being estimated by measuring a fluctuation in one rotation of the drum immediately before a start of movement of the imaging system. Alternatively, the estimation may be made by measuring the time period for a plurality of rotations of the drum before a start of movement of the imaging system.

Figure 9:
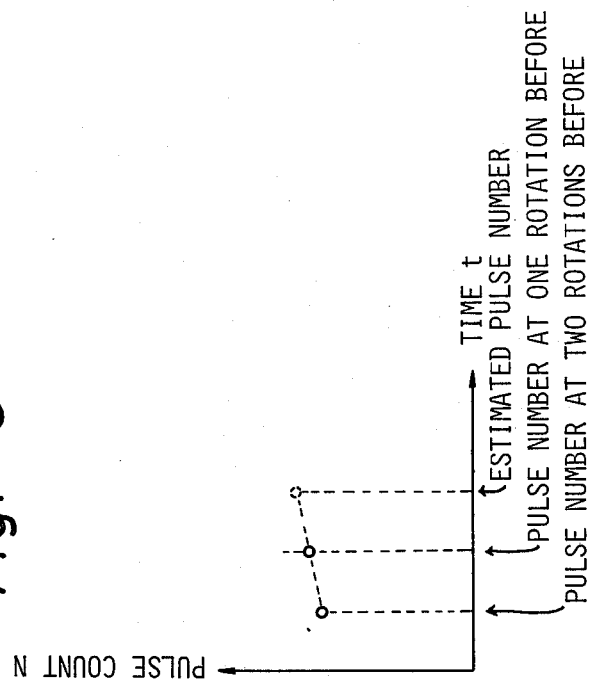
FIG. 9 is a schematic diagram explaining a method of estimating a fluctuation in the moving speed of a photoconductive drum in accordance with the present invention.

FIG. 9 is a graph demonstrating a possible method for the estimation of a drum rotation time during a scanning stroke of the imaging system. In this method, the drum rotation time is measured over two successive rotations immediately before the imaging system starts a scanning stroke.

As generally described with reference to FIGS. 4a to 4c, a photointerrupter and a light interceptor are utilized as a part of the means for measuring a drum rotation time. In the combination shown in FIG. 4b, a time period the light interceptor 104 takes to move past the photointerrupter 106 is measured; in the combination shown in FIG. 4c, a time period the light interceptor 104 moves from one to the other of the two photointerrupters $106_1$ and $106_2$ is measured.

Now, another factor affecting the moving speed of the imaging system is a change in the dimensions of the component parts of the reciprocating mechanism associated with the imaging system either with the lapse of time or with a change in the surrounding conditions such as temperature. For instance, in the imaging system with the mechanism shown in FIG. 5, any change in the diameters of the pulleys and wire with time or due to a change in temperature or the like will naturally entail a change in the moving speed of the imaging system though the rotation speed of the servo motor 112 may remain constant.

Turning back to FIG. 5, an example of means for compensating for a fluctuation in imaging system speed attributable to such a factor will be discussed. In FIG. 5, the time period necessary for the light interceptor 216 to move from one to the other of the spaced photointerrupters 218 and 220 is inversely proportional to the moving speed of the imaging system. This time period for the travel over the distance between the two photointerrupters can be measured by counting output pulses $P_{fb}$ of the encoder 110 which is driven by the servo motor 112. Thus, after the assembly of the imaging system in the machine, suppose that the distance between the photointerrupters 218 and 220 is adjusted such that "$J_o$" output pulses $P_{fb}$ of the encoder 110 are counted during a passage of the light interceptor 216 between the photointerrupters 218 and 220, while maintaining the moving speed of the imaging system at a reference speed. Then, if the diameters of the pulleys or that of the wire is changed with time or due to a change in temperature to in turn change the count of the pulses $P_{fb}$ from "$J_o$" to "$J$", the number of pulses $J$ can be expressed as:

$$J = J_o + \Delta J = J_o\left(1 + \frac{\Delta J}{J_o}\right) \qquad \text{Eq. (13)}$$

where $\Delta J$ denotes a fluctuation component of the pulse number.

Since the servo motor 112 is controlled by the output $P_{fb}$ of the encoder 110 which is driven by the servo motor 112, there must additionally be compensated for a fluctuation in the moving speed of the imaging system attributable to fluctuation $\Delta J$ in pulse number. If without this compensation, the scanning or moving speed $v_j$ will be expressed as follows when a speed fluctuation entailed by the drum and irregularity in lens focal distance and mechanical precision are zero with the ratio of magnification change $m=1$:

$$v_j = \frac{V_o}{\left(1 + \frac{\Delta J}{J_o}\right)} \qquad \text{Eq. (14)}$$

Therefore, what is only necessary is to multiply the reference speed by $(1+\Delta J/J_o)$ and Equation (4) can be rewritten as:

$$v = \frac{V_o}{m} \frac{\left(1 + \frac{m\Delta V_m}{V_o}\right)\left(1 + \frac{\Delta J}{J_o}\right)}{1 + \frac{\Delta N}{N_o}} \qquad \text{Eq. (15)}$$

Considering $\Delta J/J_o \ll 1$, $$v = \frac{V_o}{m}\left(1 + \frac{m\Delta V_m}{V_o} + \frac{\Delta J}{J_o} - \frac{\Delta N}{N_o}\right) \qquad \text{Eq. (16)}$$

$$W = m\left(1 + \frac{\Delta N}{N_o} - \frac{m\Delta V_m}{V_o} - \frac{\Delta J}{J_o}\right)W_o \qquad \text{Eq. (17)}$$

-continued $$= mW_o + \frac{mW_o}{N_o} \Delta N - \frac{m^2 W_o}{V_o} \Delta V_m - \frac{mW_o}{J_o} \Delta J$$

A procedure for the calculation at the operational circuit 122 according to Equation (17) is analogical to that for the calculation thereat according to Equation (10) and, therefore, will neither be described herein nor shown in FIG. 3.

The number of pulses J may be measured during a return stroke or a forward stroke of the imaging system one cycle ahead. A result of the measurement may be stored in a non-volatile memory so that the compensation can be performed without any trouble even at the first scan after the turn-on of a power switch.

In summary, it will be seen that the present invention provides a driving method and apparatus for an illumination type imaging system and succeeds in eliminating all the drawbacks encountered in the prior art.

Various modifications will become possible for those skilled in the art after receiving the teachings of the present disclosure without departing from the scope thereof.

What is claimed is:

1. A method of driving a movable imaging system which is driven by a first drive source in synchronism with a movable photoconductive member which is driven by a second drive source, said method comprising the steps of:
   (a) measuring a time period necessary for the photoconductive member to move a given distance;
   (b) comparing the measured time period with a predetermined reference time period to thereby estimate a fluctuation component in the time period of movement of the photoconductive member in accordance with a result of the comparison;
   (c) presetting or determining a buildup target speed and a constant target speed during a buildup scanning speed motion and a constant scanning speed motion of the imaging system in accordance with the estimated fluctuation component respectively; and
   (d) moving the imaging system at the preset buildup and constant target speeds during buildup and constant scanning speed motions thereof, respectively; whereby the imaging system is moved in synchronism with the photoconductive member.

2. A method as claimed in claim 1, in which the imaging system comprises an optical lens having a given focal length and the first and second drive sources constitute a drive mechanism, said method further comprising the following step (e), after step (c), of:
   (e) compensating the preset buildup target speed in conformity with a deviation of the focal length of the lens from a nominal focal length and a deviation of a mechanical precision of the drive mechanism from a nominal mechanical precision.

3. A method as claimed in claim 1, in which the imaging system comprises an optical lens having a given focal length and the first and second drive sources constitute a drive mechanism, said method further comprising the following step (f), after step (c), of:
   (f) compensating the preset constant target speed in conformity with a deviation of the focal length of the lens from a nominal focal length and a deviation of the mechanical precision of the drive mechanism from a nominal mechanical precision.

4. A method as claimed in claim 1, further comprising the following steps (g) and (h), after step (c), of:
   (g) detecting a speed of the imaging system during a constant scanning speed motion; and
   (h) compensating the preset constant target speed in accordance with the detected speed of the imaging system.

5. A method as claimed in claim 1, in which said photoconductive member comprises a rotatable drum of an electrostatic copying apparatus on which an electrostatic image of an original document is formed by the imaging system.

6. An apparatus for driving a reciprocable imaging system in synchronism with a movable photoconductive member in electrostatic photography comprising:
   first drive means for driving the imaging system;
   second drive means for driving the photoconductive member;
   measuring means for measuring a time period necessary for the photoconductive member to move a given distance;
   comparing means for comparing the time period with a predetermined reference time period to thereby estimate a fluctuation component in the time period of movement of the photoconductive member in accordance with a result of the comparison; and
   presetting means for determining a buildup target speed and a constant target speed during a buildup scanning speed motion and a constant scanning speed motion of the imaging system in accordance with the estimated fluctuation component respectively;
   whereby the imaging system is moved at the preset buildup and constant target speeds during buildup and constant scanning speed motions, respectively, so that the imaging system is moved in synchronism with the photoconductive member.

7. An apparatus as claimed in claim 6, in which the imaging system comprises an optical lens having a given focal length and the first and second drive sources constitute a drive mechanism, said apparatus further comprising first compensating means for compensating the preset buildup target speed in conformity with a deviation of the focal length from a nominal focal length of the lens and a deviation of a mechanical precision of the drive mechanism from a nominal mechanical precision.

8. An apparatus as claimed in claim 7, further comprising second compensating means for compensating the preset constant target speed in conformity with the deviation of the focal length of the lens and the deviation of the mechanical precision of the drive mechanism.

9. An apparatus as claimed in claim 6, further comprising detecting means for detecting a speed of the imaging system during a constant scanning speed motion, and third compensating means for compensating the preset constant target speed in accordance with the detected speed of the imaging system.

* * * * *